Aug. 19, 1952  H. J. LAZARUS  2,607,263
ANIMATED PICTURE VIEWER AND PICTURES IN BOOK FORM
Filed June 28, 1947  5 Sheets-Sheet 1

INVENTOR.
Harry Joseph Lazarus
BY
Moses, Nolte, Crew and Berry
Attorneys

Aug. 19, 1952         H. J. LAZARUS         2,607,263
ANIMATED PICTURE VIEWER AND PICTURES IN BOOK FORM
Filed June 28, 1947         5 Sheets-Sheet 2
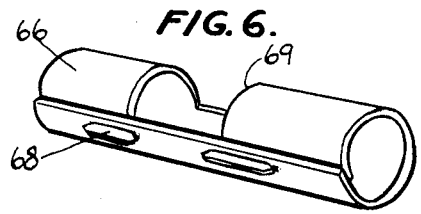
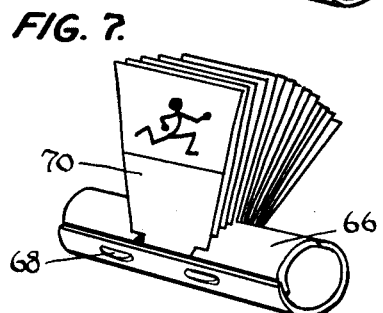
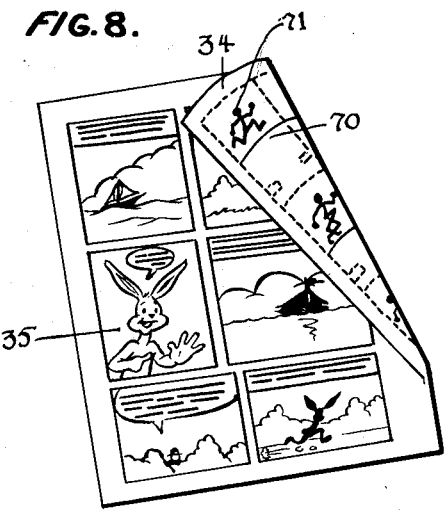
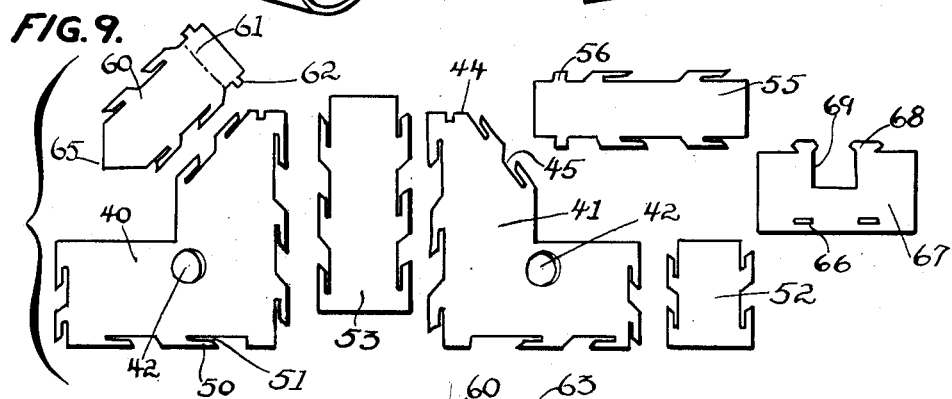
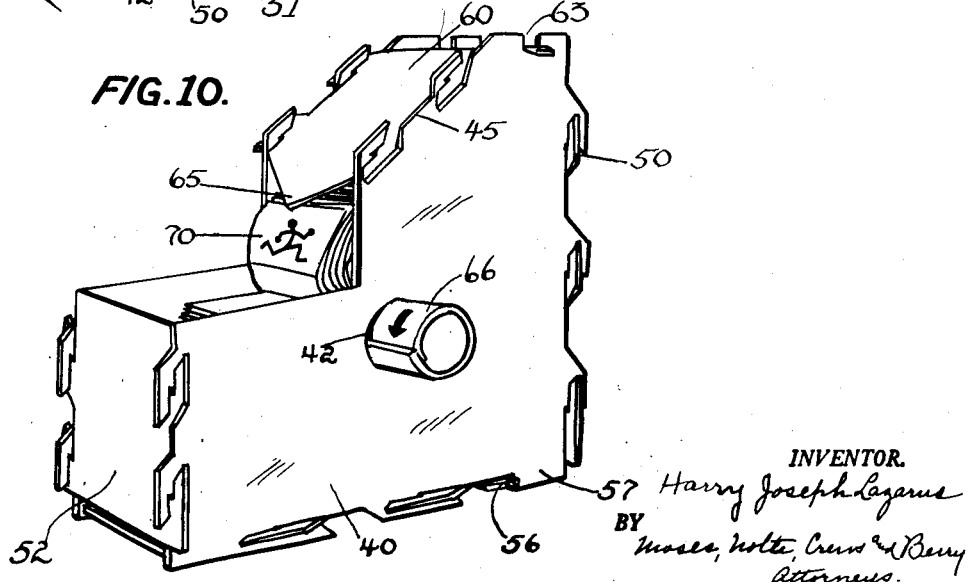
INVENTOR.
Harry Joseph Lazarus
BY
Moses, Nolte, Crew & Berry
attorneys.

Aug. 19, 1952  H. J. LAZARUS  2,607,263
ANIMATED PICTURE VIEWER AND PICTURES IN BOOK FORM
Filed June 28, 1947  5 Sheets-Sheet 3
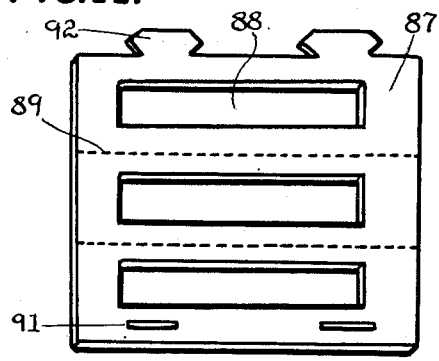
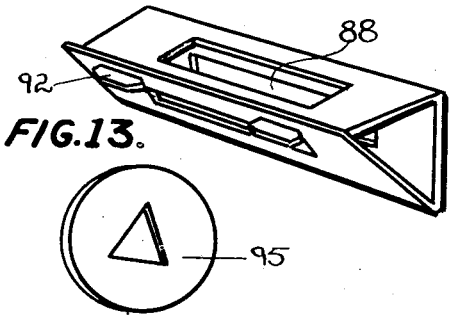
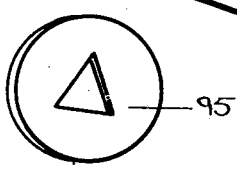
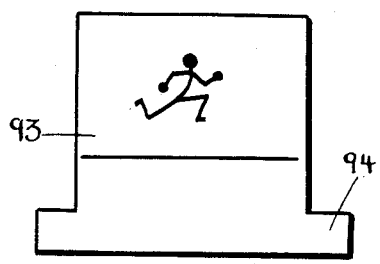
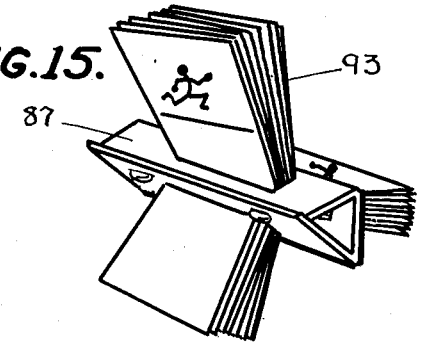
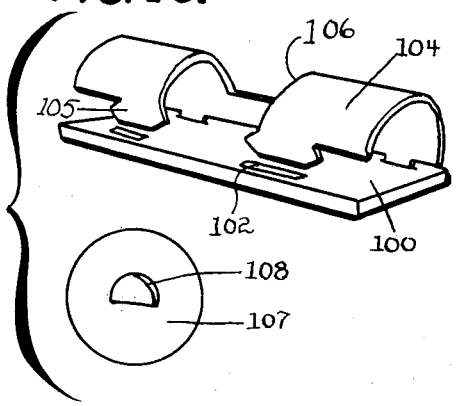
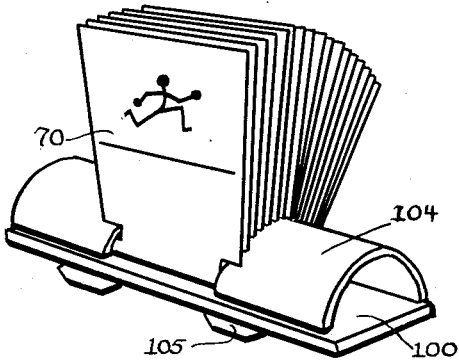
INVENTOR.
Harry Joseph Lazarus
BY
Moses, Nolte, Crew and Berry
Attorneys.

Aug. 19, 1952           H. J. LAZARUS           2,607,263

ANIMATED PICTURE VIEWER AND PICTURES IN BOOK FORM

Filed June 28, 1947           5 Sheets-Sheet 4

INVENTOR.
Harry Joseph Lazarus
BY
Moses, Nolte, Crew and Berry
Attorneys

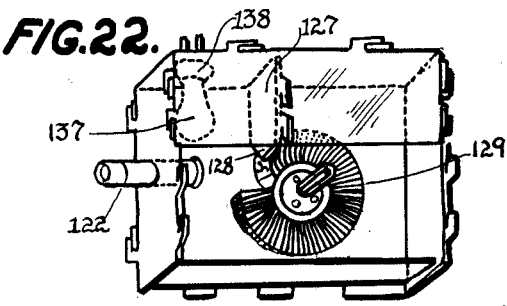
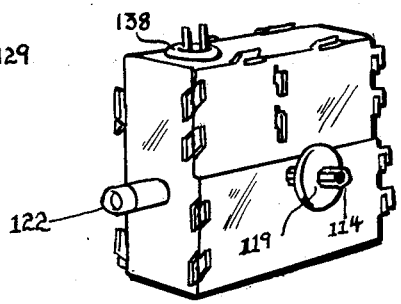
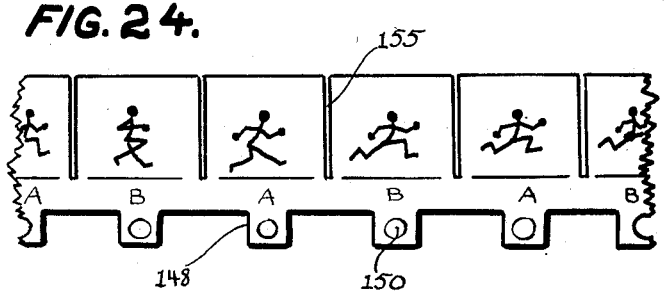
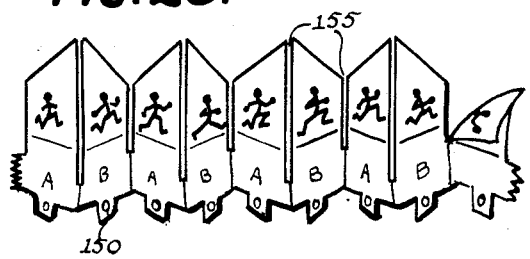
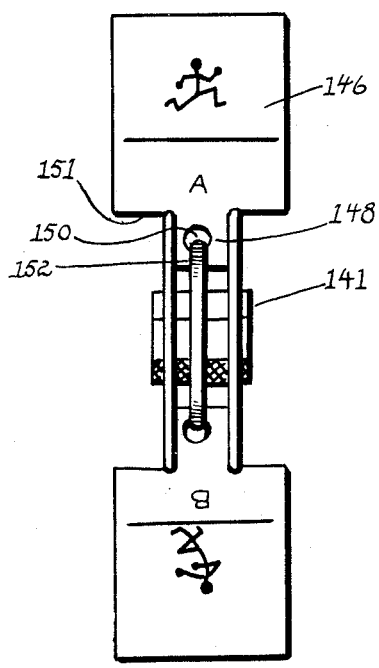

Patented Aug. 19, 1952

2,607,263

UNITED STATES PATENT OFFICE 2,607,263

ANIMATED PICTURE VIEWER AND PICTURES IN BOOK FORM

Harry Joseph Lazarus, New York, N. Y.

Application June 28, 1947, Serial No. 757,774

3 Claims. (Cl. 88—19)

This invention relates to motion picture devices.

It is an object of the present invention to provide a motion picture device which can be made from parts struck out of a cardboard sheet which may be of the form of covers of a book within which there are pages which make up and provide the animated pictures for the device. By utilizing the book form in which parts of the stiff covers may be used to assemble a viewing box, while the pages of the book may be divided up to form a series of animated picture units, a commercial entity is provided in a very practicable and salable form which is complete in itself, containing all of the elements necessary to provide a working motion picture viewer together with the picture elements to be viewed. The picture elements coming in the form of flat sheets are easily manufactured and are maintained in order for ready assembly and are preserved by the book covers so that they will not become misplaced or damaged prior to use. On one side of each sheet comic cartoons, puzzles, magic tricks or stories may be printed so that the book will have value and salability whether the purchaser is interested in setting up the animated picture viewer or not.

It is another object of the present invention to provide a motion picture device which can be made cheaply and sold at a low price for amusing children and as a toy which will be constructive and give pleasure to the child while forming and building up the device and as well when the device has been completed for use to display pictures. In some instances provision may be made for a lamp to direct light upon the pictures to be displayed so that the picture can be projected through a tube or lens holder and upon a screen.

For other objects and for a better understanding of the invention, reference may be had to the following detailed description taken in connection with the accompanying drawing, in which Fig. 1 is a perspective view of a book bound in heavy cardboard and having pages therein containing animated cartoons, magic tricks, puzzles, stories and other items which are amusing to children and with the parts of the moving picture device laid out upon the covers of the book;

Fig. 6 is a perspective view of the shaft which has been rolled from the blank shown in Fig. 5;

Fig. 7 is a perspective view of the shaft shown in Fig. 6 with the movie pictures of Figs. 3 and 4 assembled with it;

Fig. 8 is a perspective view of one of the pages of the book and showing the back of the page and as well the front where the movie pictures are disposed, the back being used for comic stories, magic tricks and the like;

Fig. 9 is a collective view in plan of the several parts which have been separated from the covers and prepared for assembly into the box-like structure constituting the viewer in which the animated pictures are to be displayed;

Fig. 10 is a perspective view of the assembled box-like structure with the locking tabs or projections of the various parts locked in one another and with the animated pictures mounted therein;

Fig. 11 is a perspective view of a blank which is used to form a shaft, the shaft being of a different construction from that shown in Figs. 5 and 6;

Fig. 12 is a perspective view of the assembled shaft formed from the blank of Fig. 11;

Fig. 13 is a perspective view of one of the discs which is put on the shaft to hold it firm and to serve as a hand wheel for turning the shaft;

Fig. 14 is a plan view of a picture which is used with the shaft as shown in Fig. 12;

Fig. 15 is a perspective view of the reel or shaft of Fig. 13 with several pictures assembled thereupon;

Fig. 16 is a perspective view of another form of shaft assembly for supporting the several pictures;

Fig. 17 is a perspective view of the shaft assembly with the pictures connected thereto;

Fig. 22 is a perspective view of the projector shown in Fig. 18 with the door removed and the picture reel shown therewithin;

Fig. 23 is a perspective view of the projector with the door in place and the shaft projecting from the side of the projector with the handles thereon by which the shaft may be turned;

Fig. 24 is a plan view of a picture strip containing a series of picture units which may be used in the reel of Fig. 21;

Fig. 25 is a perspective view showing how the picture strip of Fig. 24 may be folded up into accordion form prior to assembly with the reel; and Fig. 26 is an edge view of the reel shown in Fig. 21, all but two of the pictures being omitted for clearness of illustration.

Figure 1:
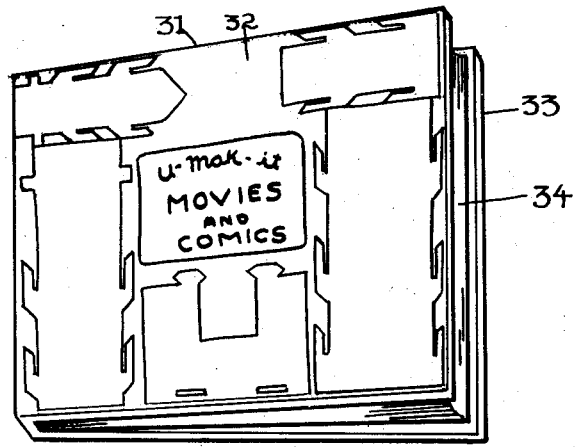
Figure 2:
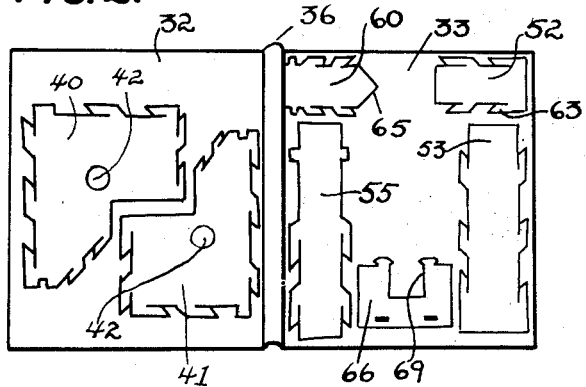
Fig. 2 is a plan view of the book covers spread and turned to show the back as well as the front cover.
Figure 3:
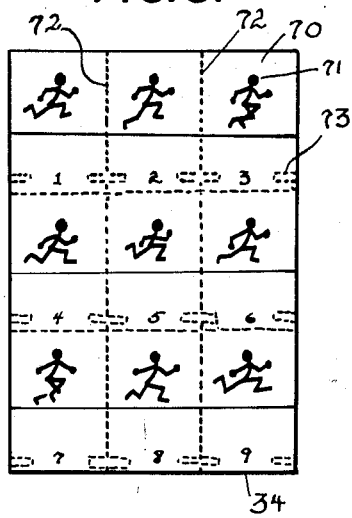
Fig. 3 is a plan view of one of the pages within the book which contains a plurality of the pictures forming part of a complete animated picture or cartoon.
Figure 4:
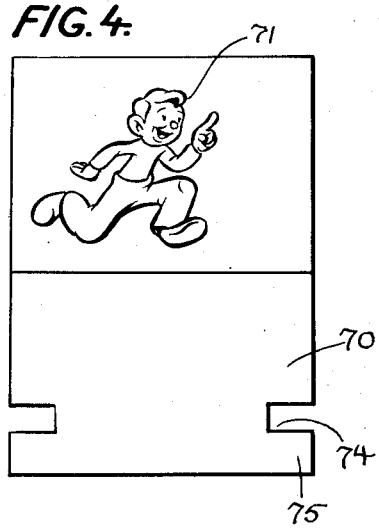
Fig. 4 is a large plan view of one of the picture elements after it has been cut or separated from the book page.
Figure 5:
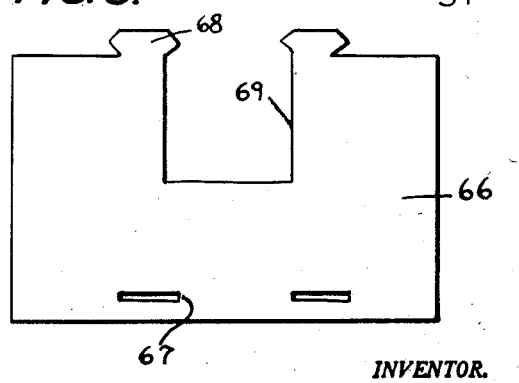
Fig. 5 is a plan view of a form of blank from which the picture carrying shaft is made.
Figure 18:
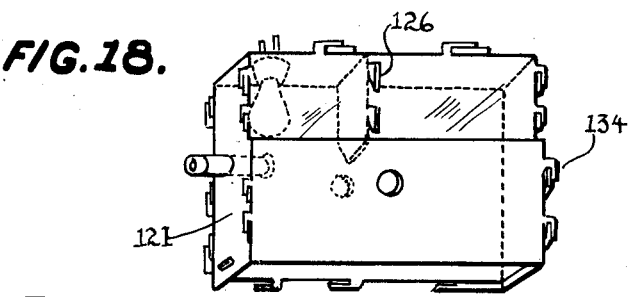
Fig. 18 is a perspective view of a motion picture device made of interlocked parts and constructed to form a movie projector.

Referring now particularly to Figs. 1 to 10, 31 represents a book formed with a front cover 32, a rear cover 33 and several pages 34. The covers are made of heavy cardboard and are scored or lined to provide the parts of the moving picture device. These parts are taken from the cover by cutting or by breaking along scored or perforated lines and can be assembled into the exhibitor device shown in Fig. 10. The pages 34 include a series of animated picture units and other pages bearing magic tricks, stories for children, or other items of interest to children. These items can be on the reverse side of the sheet from which the film pieces are disposed as shown at 35 in Fig. 8. The covers are joined by a back or binding 36 as shown clearly in Fig. 2. As will be seen, the cover and pages constitute a complete book which can be displayed on the counters of news stands or the like and can be used as a book by the purchaser prior to dividing the same up to assemble the motion picture viewer with the animated pictures therein. If the purchaser does not care to assemble the motion picture viewer, the book still has interest and value as such. The covers of the book protect the animated picture units which are thus maintained in condition for separation and use as an animated picture whenever desired. By making up the entire combination of elements necessary for the making of the viewer and the elements of the animated picture in book form, no special means for packing these parts is required. The complete device in book form can, therefore, be sold at a minimum of cost.

The viewer may be of such construction as to be assembled from parts of various shapes. In the example shown in Figs. 1 to 10, the entire viewer is assembled from the seven parts shown in Fig. 9. These parts comprise a pair of sidewalls 40 and 41, each having a hole 42 therein through which the rotary shaft on which the elements of the animated picture are mounted extends. These parts 40 and 41 have top portions 44 having inclined front edge portions 45. In the arrangement shown in Fig. 2, the two sidewall portions are laid out on a back cover of the book. The parts 40 and 41, as well as the other wall parts to be described are provided with suitable means for interlocking with other parts to form the box or casing. As illustrated, the parts are provided with locking tabs 50 which are of hook shape, the hook portions being separated from the body of the piece by narrow slots 51 of a width to receive the thickness of the cardboard interlocked therewith so that the parts will slide together with a close fit which will hold them in assembled relationship.

A piece 52 is provided to form a front wall for the casing, this having tabs adapted to interlock with the tabs 50 of the sidewalls. A tabbed section 53 is provided to form the back of the casing. The bottom of the casing is formed by a similarly tabbed portion 55, the latter being provided with a pair of straight tabs 56 which engage in front of projections 57 after the hook tabs on the bottom section are engaged with the hook tabs of the bottom edges of the sidewalls. This engagement keeps the tabs on the bottom from becoming disengaged. The top of the casing is formed by a part 60 which has hooked tabs engaging with the hooked tabs on the inclined edges 45 of the sidewalls. The top part 60 is arranged to be partially folded along a score line indicated at 61 and is provided with straight tabs 62 which engage in notches 63 formed in the top edges of the sidewalls. At the front of the top member 60 is a projecting member 65, preferably of pointed form which engages the edges of the pictures and holds the successive pictures stationary long enough to be viewed—releasing them so as to cause them to flip over as the shaft on which the pictures are mounted is rotated. This pointed portion, therefore, is referred to as the tripping device or flipper. In the construction shown in Fig. 2, the parts 52, 53, 55 and 60 are all arranged on the front cover of the book, together with a part 66 constituting a blank which can be rolled up to form the shaft or reel shown in Fig. 6.

The reel shown in Fig. 6 is formed out of the blank 66 which has slots 67 near one edge thereof and tongues 68 near the other edge which when the blank is rolled in cylindrical form are passed through the slots 67, thereby locking the reel into the cylindrical shape. This construction is very simple and effective and permits a rotatable reel to be formed out of the flat cardboard blank. The reel has a wide slot 69 therein which is adapted to receive the lower ends of the individual picture elements 70 which are formed by tearing the sheets apart along the perforated lines 72 shown in Fig. 3. The sheets also have perforated portions 73 which may be torn out to form notches 74 which receive the edges of the reel at either side of the slot 69, as shown in Fig. 7. The corners 75 of the picture units interlock inside of the slot thereby holding the picture units in place. The outer part of each picture unit carries an animated picture element indicated at 71. These picture elements may be drawings or photographs, each differing slightly from the preceding one in the usual manner so that when the pictures are snapped an appearance of motion will be produced. If desired, the pictures may be in color. The shaft is somewhat longer than the width of the box so that when it is placed in position its ends will project through the holes 42 and may be grasped for slowly rotating the shaft so as to cause the pictures to snap by the flipper 65.

The picture elements are preferably serially numbered in an inconspicuous place so that they may be properly assembled in order and stacked prior to insertion in the reel. Owing to the fact that the elements are printed in regular order on successive sheets of the book it is very easy to keep them in such order, but the use of serial numbers is desirable in case they are carelessly handled when being separated and stacked. The construction of the picture elements and reel is such that the elements can be inserted into the reel in a single bunch or stack, or in a few groups thereby making the assembly operation quick and easy. Furthermore, a very substantial number of the stacked picture elements can be held by the reel, 300 or 400, for instance, thereby giving a sequence long enough to be effective as an animated picture. This way of assembling the elements in a bunch or stack is much superior to the use of means designed to hold each picture element separately on the periphery of the reel. Such arrangements require a great deal of labor in applying each separate element and furthermore the capacity of the reel is seriously limited by the necessity of providing the separate slot or other attaching means for each individual picture element.

Referring now particularly to Figs. 11 to 15, there is shown a modified form of shaft and picture unit. This shaft is made from a sheet or blank 87 of the shape shown in Fig. 11, has a plurality of elongated openings 88, and can be folded along lines 89. At the edge are slots 91 adapted to receive projections 92 whereby to form a shaft and retain the same folded as indicated in Fig. 12. The picture units 93 are as indicated in Fig. 14 of different shape from the units shown in Fig. 4 and have projections 94 at the base of the same which will be extended beyond the ends of the openings 88 to retain the units in the shaft as shown in Fig. 15. A disc or discs 95 (Fig. 13) may be fitted on the shaft if desired.

Figs. 16 and 17 show another modified form of shaft comprising a flat piece 100 having slots 102 at each edge thereof, this being combined with another flat blank 104 which is curved into semi-circular shape and which has tongues 105 thereon adapted to interlock with the slots 102. The blank 104 has a slot 106 similar to the slot 69 in the blank of Fig. 5. The picture elements may be of the form shown in Fig. 4, or of the form shown in Fig. 14. Also, if desired, a disc 107 having a half round opening 108 therein may be slipped over one end of the shaft after it has been placed in the box so as to strengthen it and provide a hand wheel by which it may be rotated. A similar disc may be placed on the other end of the shaft, if desired.

Figure 19:
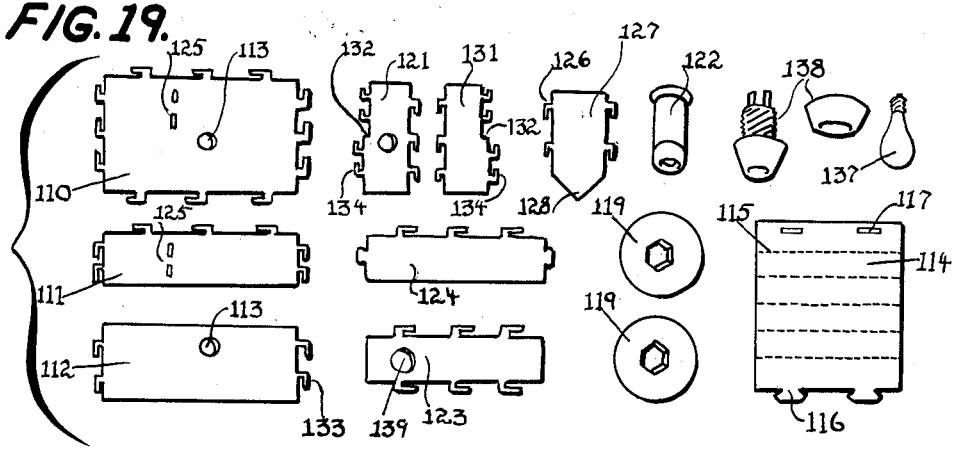
Fig. 19 is a collective view of the several parts serving to form the projector shown in Fig. 18.
Figure 20:
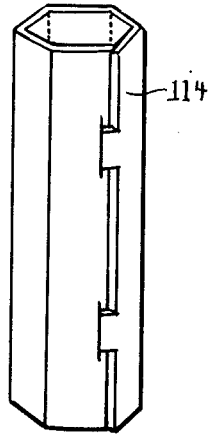
Fig. 20 is a perspective view of a form of shaft which may be used with the projector of Fig. 18.
Figure 21:
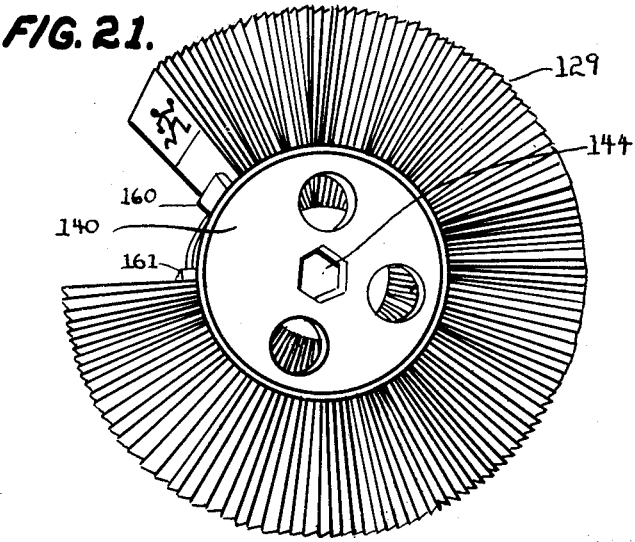
Fig. 21 is a perspective view of a picture carrying reel with the several pictures assembled thereupon.

Figs. 18 to 26 show a modified form of device which is in the nature of a movie projector. Parts for this projector can be provided on the covers of a book, if desired, and separated therefrom in the same manner as for other devices above described. These several parts are shown in Fig. 19. These parts include a full side part 110, a top side piece 111 and a removable cover 112. The side 110 and the door or cover 112 each has a hole 113 through which extends a shaft 114. The shaft is formed by folding a flat blank along dotted lines 115 and securing the same together at its ends by the tabs 116 entering slots 117. The shaft when folded and formed is of hexagonal section adapted to receive hand wheels 119, if desired.

On the front there is disposed a front piece 121 on which is supported a lens tube carrying a lens 122. On the top is a piece 123 and on the bottom is a piece 124. In the pieces 110 and 111 are vertically spaced holes 125 for receiving tabs 126 of a tripping device or flipper 127. This flipper is pointed as at 128 and is adapted to bear against picture elements of reel 129, Fig. 21. A back piece 131 is disposed between the sides. Both the front and back pieces 121 and 131 are provided with shoulders 132 against which the upper edge of door 112 is rested. The door 112 has projections 133 adapted to hang over projections 134 on the front and rear pieces 121 and 131. The door is presumably wide enough so that its upper edge will slightly overlap the lower edge of wall 111 so as to prevent leakage of light at this point.

In order that the picture will be projected through the lens in the tube 122, a lamp bulb 137 is fitted in a socket 138 supported through hole 139 in the top piece 123. Light rays will be projected upon the picture elements and reflected through the lens thereby causing the animated picture to be projected upon a screen. All parts of this construction can be formed of interlocking cardboard parts, except the lens tube and lens, and lamp bulb and socket.

For mounting the individual picture units upon the shaft 114, a reel is provided comprising a pair of discs 140 which may be secured together in spaced relationship by a short tube or core 141 of metal, cardboard or other suitable material. The discs have hexagonal holes 144 therein through which slides the hexagonal shaft 114. The picture elements 146 are provided with inwardly projecting tabs 148 in which are holes 150. The tabs 148 fit loosely between the discs, the shoulders 151 of the picture elements resting upon the peripheries of the discs. The engagement of the tube and shoulders with the reel discs keeps the pictures in good alignment. The pictures are retained in this position by a circular element 152 which may be a cord, wire, coil spring or the like. With this construction, a large number of pictures may be employed, for instance, 2500 or 3000. Stops 160 are mounted between the discs of the reel to mark the beginning and end of the picture sequence. By removing the cover 112, the reel with the pictures can be slipped off of the shaft and reversed or replaced by another reel.

A desirable way of preparing the pictures for use on the reel is shown in Figs. 24 and 25. In accordance with this construction, the pictures are printed in long strips, each picture being associated with its perforated tab 148. The pictures are partly separated by slots 155 so that they may be readily folded up into accordion form in the manner indicated in Fig. 25. When closely folded in this form all the perforations in the tabs will register so that the attaching element 152 may be threaded through the perforations and its ends secured together so as to attach the pictures to the reel. This method of making the pictures prevents them from getting out of order and as the pictures are not entirely separated at their lower parts, they are held in better alignment. With this construction, it will be seen that every alternate picture is presented in a sequence. The strips are preferably printed on both sides of the strip so that the pictures on one side of one section will be followed by the pictures on the opposite side of the next section and so on throughout the series. Two sequences are preferably printed on the strip so that if the reel is reversed another motion picture sequence will be presented.

While various changes may be made in the detail construction, it shall be understood that such changes shall be within the spirit and scope of the present invention as indicated by the appended claims.

Having described my invention, what I claim is:

1. A book having covers of heavy cardboard-like material with outlined areas thereon which when severed from the cover serve when fitted together to provide a box-like structure, said fitted parts having openings therein for reception of the ends of a shaft by which movie pictures may be displayed when the shaft is rotated, said shaft being formed out of a blank forming a part of the book cover, said shaft being formed with at least a part of its surface cylindrical, there being an elongated wide slot formed in said surface and extending peripherally thereof, and pages within the book comprising movie picture elements which can be severed from the same, said picture elements having severable portions to provide the elements with attaching tongues, whereby the picture elements can be separated and stacked in a close stack and interlocked with the edges of the wide slot in the cylindrical shaft surface, with the outer edges of the picture elements lying in a curve substantially concentric with the curved surface of the shaft.

2. An exhibitor for animated pictures comprising a casing with a rotatable shaft thereon, said shaft comprising a blank of cardboard-like material having longitudinally extending edges and an elongated slot extending from one longitudinally-extending edge of said blank toward the opposite edge, said one edge and the opposite edge of the blank having interlocking formations, said shaft being formed into cylindrical form with the said interlocking formations engaged so as to retain the shaft in such form, and a stack of superimposed animated picture elements of paper mounted in said slot, said elements having formations interlocking with side edge portions of the slot for holding the stack of picture elements to the shaft, said stack of picture elements being retained in said slot by the inner end edge of the slot and the opposite longitudinal edge of the blank when the formations on the blank are interlocked, the outer edges of said stack of animated picture elements lying in a curve substantially concentric with the cylindrical surface of the shaft.

3. An exhibitor for animated pictures comprising a casing with a rotatable shaft thereon, said shaft comprising a blank of cardboard-like material having longitudinal side portions and an elongated slot extending from one longitudinal side portion of said blank toward the opposite side portion, said shaft being curved to provide a cylindrical surface running with the slot and between the longitudinal side portions, interlocking means extending between the side portions of the blank to retain the blank in its curved shape and a stack of superimposed animated picture elements of paper mounted in said elongated slot and extending from one end thereof to the other end, said picture elements having formations interlocking with side edges of the slot for holding the stack of picture elements to the shaft, said stack of picture elements being operable and guided over the cylindrical surface and the outer edges of the stack of animated picture elements lying in a curve substantially concentric with the cylindrical surface of the blank.

HARRY JOSEPH LAZARUS.

REFERENCES CITED

The following references are of record in the file of this patent:

UNITED STATES PATENTS

| Number | Name | Date |
|---|---|---|
| 575,761 | Short | Jan. 26, 1897 |
| 597,759 | Casler | Jan. 25, 1898 |
| 720,876 | Atherton | Feb. 17, 1903 |
| 779,364 | Jenkins | Jan. 3, 1905 |
| 819,514 | Cahill et al. | May 1, 1906 |
| 948,272 | Ferguson | Feb. 1, 1910 |
| 1,065,562 | Spoerer | June 24, 1913 |
| 1,131,494 | Earle | Mar. 9, 1915 |
| 1,225,392 | Arkin et al. | May 8, 1917 |
| 1,353,774 | Mason | Sept. 21, 1920 |
| 1,903,272 | Tebeau | Mar. 28, 1933 |
| 2,190,646 | Branson | Feb. 20, 1940 |
| 2,197,268 | Gold | Apr. 16, 1940 |
| 2,258,722 | Saunders | Oct. 14, 1941 |
| 2,452,776 | MacMechan | Nov. 2, 1948 |
| 2,478,697 | Juhn | Aug. 9, 1949 |

FOREIGN PATENTS

| Number | Country | Date |
|---|---|---|
| 652,959 | France | Oct. 30, 1928 |
| 507,642 | Great Britain | June 19, 1939 |
| 527,586 | Great Britain | Oct. 11, 1940 |